US012637909B2

(12) United States Patent
Filion et al.

(10) Patent No.: US 12,637,909 B2
(45) Date of Patent: May 26, 2026

(54) MOBILITY CONTROL FOR MOBILE DRILLING RIG

(71) Applicant: Caterpillar Inc., Peoria, IL (US)

(72) Inventors: Stéphane Filion, Blainville (CA);
David Moreau, Boisbriand (CA)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/968,251

(22) Filed: Oct. 18, 2022

(65) Prior Publication Data

US 2024/0125180 A1     Apr. 18, 2024

(51) Int. Cl.
| | |
|---|---|
| *E21B 7/02* | (2006.01) |
| *E21B 44/00* | (2006.01) |
| *G01F 22/00* | (2006.01) |
| *G05D 1/00* | (2006.01) |
| *G05D 1/246* | (2024.01) |
| *G05D 105/05* | (2024.01) |
| *G06T 11/00* | (2006.01) |
| *E21B 15/04* | (2006.01) |

(52) U.S. Cl.
CPC ............... *E21B 7/022* (2013.01); *E21B 7/02* (2013.01); *E21B 44/00* (2013.01); *G01F 22/00* (2013.01); *G05D 1/0214* (2013.01); *G06T 11/00* (2013.01); *E21B 15/04* (2013.01)

(58) Field of Classification Search
CPC .................................. E21B 7/02; E21B 7/022
See application file for complete search history.

(56) References Cited

U.S. PATENT DOCUMENTS

| | | | |
|---|---|---|---|
| 8,612,084 B2 | 12/2013 | Hennessy et al. | |
| 8,733,473 B2 | 5/2014 | Nadeau et al. | |
| 9,129,236 B2 | 9/2015 | Elinas et al. | |
| 9,678,508 B2 | 6/2017 | Cima | |
| 10,208,592 B2 * | 2/2019 | Rimmington | ....... E21D 23/0065 |
| 10,597,959 B2 * | 3/2020 | Rao | ......................... E21B 21/01 |
| 11,073,000 B2 | 7/2021 | Oppolzer | |
| 11,168,564 B2 | 11/2021 | Lundh et al. | |
| 2018/0266247 A1 * | 9/2018 | Lundh et al. | |
| 2019/0043141 A1 | 2/2019 | Lundh et al. | |
| 2019/0309614 A1 * | 10/2019 | Benson | ................ E21B 49/005 |
| 2020/0117201 A1 * | 4/2020 | Oetken | ............... G05D 1/0231 |
| 2020/0394813 A1 * | 12/2020 | Theverapperuma et al. | |
| 2021/0350114 A1 * | 11/2021 | Ram | |
| 2023/0031524 A1 * | 2/2023 | Ready-Campbell et al. | |

FOREIGN PATENT DOCUMENTS

CN          103061736 A     4/2013

* cited by examiner

*Primary Examiner* — Tara Schimpf
*Assistant Examiner* — Ursula Lee Norris

(57)          ABSTRACT

A mobile drilling rig is configured to drill boreholes into the ground about a drill site. To assist navigating the mobile drilling rig and other machines about the drill site, a material pile mapping system can be included that includes the borehole locations and an estimated material pile dimension associated with a material pile formed about the borehole from material removed during drilling of the borehole. The material pile dimension can be estimated from an estimated material pile volume of the material removed from the borehole.

14 Claims, 6 Drawing Sheets

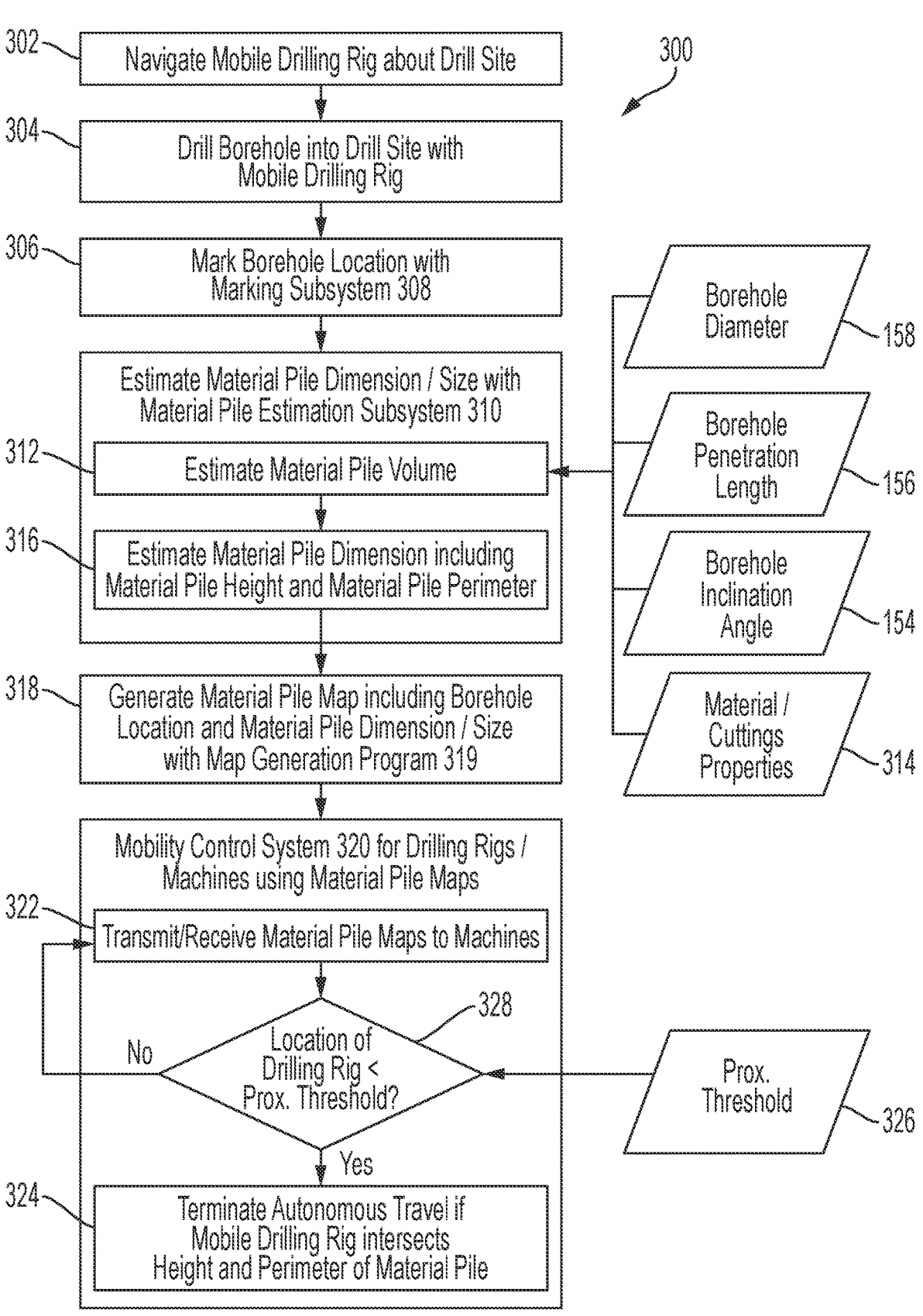

302 — Navigate Mobile Drilling Rig about Drill Site

300

304 — Drill Borehole into Drill Site with Mobile Drilling Rig

306 — Mark Borehole Location with Marking Subsystem 308

Estimate Material Pile Dimension / Size with Material Pile Estimation Subsystem 310

312 — Estimate Material Pile Volume

316 — Estimate Material Pile Dimension including Material Pile Height and Material Pile Perimeter Borehole Diameter — 158

Borehole Penetration Length — 156

Borehole Inclination Angle — 154

318 — Generate Material Pile Map including Borehole Location and Material Pile Dimension / Size with Map Generation Program 319

Material / Cuttings Properties — 314

Mobility Control System 320 for Drilling Rigs / Machines using Material Pile Maps 322 — Transmit/Receive Material Pile Maps to Machines

328

No ◄— Location of Drilling Rig < Prox. Threshold?

Prox. Threshold — 326

Yes

324 — Terminate Autonomous Travel if Mobile Drilling Rig intersects Height and Perimeter of Material Pile

FIG. 5

MOBILITY CONTROL FOR MOBILE DRILLING RIG

TECHNICAL FIELD

This patent disclosure relates generally to mobile drilling rigs for drilling a borehole into the earth and, more particularly, relates to a system and method of mapping a drill site so the mobile drilling rig can map and avoid material piles formed by drilling.

BACKGROUND

Mobile drilling rigs are large mobile machines used to drill boreholes into the ground of the earth. For example, in a mining operation, a plurality of boreholes may be drilled that penetrate to a certain depth into the ground about a drill site. The boreholes may be packed with explosives that are detonated so that the resulting explosion fractures the surrounding bedrock and earth, thereby simplifying removal of the materials from the drill site. Mobile drilling rigs may also be used in the petroleum and gas industry, developing water wells, mineral extraction and other uses.

Mobile drilling rigs typically include a mast that can be positioned vertically with respect to the surface of the drill site and a drill string that is supported by and extendable with respect to the mast. A drill bit or cutting head can be located at the distal end of the drill string. When the drill string is caused to rotate, the torque transmitted through the drill string causes the drill bit to penetrate into the earth and form a borehole. The drill string may be formed and shaped to convey and transfer the drill cuttings through the borehole to the surface of the drill site. The drill cuttings can form material piles about the work site.

To enable movement about the drill site, mobile drilling rigs include propulsion devices such as continuous tracks or wheels. The propulsion devices allow the drilling rig to drill a plurality of boreholes about the drill site at different locations in accordance with a pattern or the like. The mobility of the drilling rig also necessitates the avoidance of objects, hazards, and the like about the drill site. To assist an operator with maneuvering the mobile drilling rig about the drill site, the machines can be equipped with perception systems to detect and avoid objects. Furthermore, mobile drilling rigs are presently being configured for autonomous operation that benefit from the assistance provided by perception and object detection and avoidance systems and the like. The present disclosure is, in an aspect, directed to systems and methods to assist in maneuvering the mobile drilling rig about a drill site.

SUMMARY

The disclosure describes, in one aspect a mobile drilling rig for drilling a plurality of boreholes about a drill site. The mobile drilling rig includes a rig frame supported on a plurality of propulsion devices to travel about the drill site. The mobile drilling rig includes a mast mounted to the rig frame and a drill string that is extendable with respect to the mast for drilling the boreholes. To generate a map of the drill site, the mobile drilling rig can be associated with a material pile mapping system that includes a borehole marking subsystem and a material pile estimation subsystem. The borehole marking subsystem can mark borehole locations for each of the plurality of boreholes, thereby resulting in a plurality of borehole locations. The material pile estimation subsystem can estimate one or more material pile dimensions associated with a material pile formed about each of the plurality of boreholes due to the removal of material when the boreholes are drilled. The material pile mapping system can also be associated with a map generation program that generates a material pile map including the plurality of borehole locations and the one or more material pile dimensions.

In another aspect, there is disclosed a material pile mapping system for navigating a mobile drilling rig about a drill site. The material pile mapping system includes a borehole marking subsystem programmed to mark a borehole location of a borehole drilled into the drill site and a material pile estimation subsystem programmed to estimate one or more material pile dimensions associated with a material pile formed about the borehole. The material pile mapping system further includes a map generation program programmed to generate a material pile map including the borehole location and the one or more material pile dimensions.

In a further aspect, the disclosure describes a method of operating a mobile drill rig. According to the method, a borehole is drilled into a surface at a drill site with a drill string of a mobile drilling rig and the borehole location is marked at the drill site. The method can estimate an estimated material pile volume of the material removed by drilling of the borehole based on a penetration length of the borehole and a borehole diameter. The method can further estimate a material pile dimension predicated on the material pile volume where the material pile dimension includes at least one of a material pile height and a material pile perimeter.

BRIEF DESCRIPTION OF THE DRAWINGS

FIG. 5 is an illustrative flow diagram of a possible routine, process, or algorithm to estimate the bore hole location and the material pile dimensions to assist in maneuvering the mobile drilling rig.

DETAILED DESCRIPTION

Figure 1:
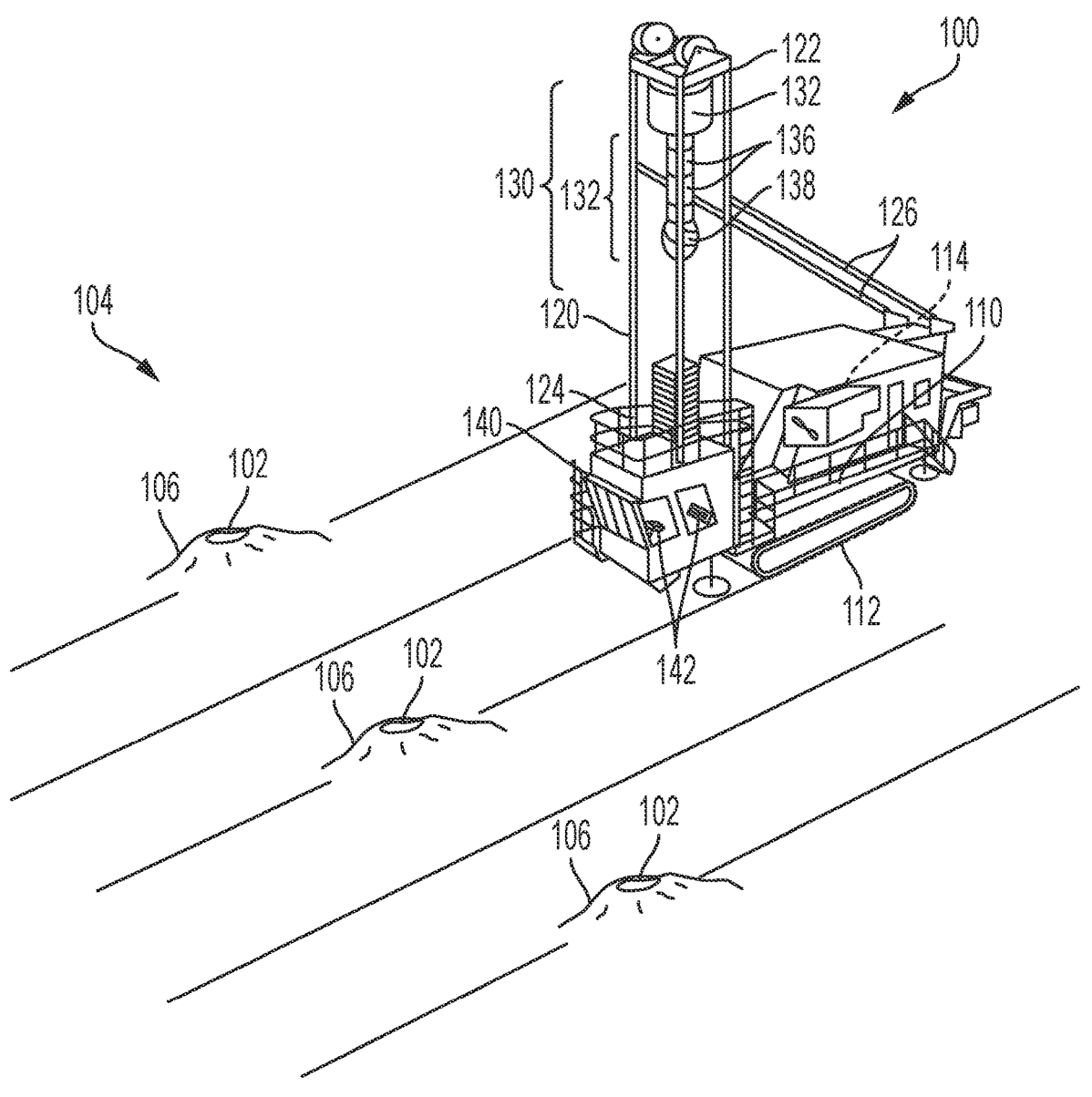
FIG. 1 is a perspective view of a mobile drilling rig maneuvering over a drill site to drill a plurality of boreholes and the attendant formation of a plurality of material piles.

Now referring to the figures, wherein whenever possible like reference numbers refer to like elements, there is illustrated a mobile drilling rig 100 that can drill boreholes 102 into the surface and underlying subsurface at a drill site 104 for oil and gas extraction, mineral procurement, well formation, and other uses. One particular drilling operation is blast hole drilling in which explosives are packed into the borehole 102 formed by the drilling rig 100 and are deto-
nated with the resulting explosion fracturing the underlying
rock of the subsurface of the drill site 104. Fracturing the
rock facilitates removal from the drill site 104 using con-
ventional excavating and hauling machines. A result of
drilling boreholes 102 is the attendant formation of material
piles 106 surrounding the boreholes that are disposed about
the drill site 104 and that include the cuttings, dirt, and rock
removed from the boreholes. The drill cuttings, dirt, and
rock may be generally referred to as material.

To travel and maneuver about the drill site 104, the
illustrated mobile drilling rig 100 includes a rig frame 110
that is supported on a plurality of propulsion devices 112 that
contact the surface of the drill site 104. The propulsion
devices 112 may be continuous tracks or crawler tracks that
can translate with respect to the rig frame 110 thereby
moving the mobile drilling rig 100 over the drill site 104. In
other embodiments, the propulsion devices 112 can be
pneumatic wheels that are rotatable with respect to the rig
frame 110. To power the propulsion devices 112 and other
systems of the drilling rig 100, a motor 114 is disposed on
the rig frame 110. The motor 114 may be an internal
combustion engine that combusts hydrocarbon-based fuels
and converts the energy therein to a motive force. In other
embodiments, the motor 114 may be operatively connected
to an external source of electrical power and can receive
electrical current to power operation of the drilling rig 100.
While the illustrated embodiment of the drilling rig 100 is
mobile, aspects of the disclosure may also be applicable to
more stationary drilling rigs that can be towed about the drill
site 104 and to other configurations.

The drilling rig 100 can include a mast 120 that is an erect
structure that can be vertically positioned with respect to the
drill site 104. The mast 120 is an elongated structure that
extends between a top or crown 122 that is vertically
elevated above the rig frame 110 and a base 124 that is
located proximate to the surface of the drill site 104. The
mast 120 can be assembled as a truss made from a plurality
of metal beams and bars interconnected together to form a
rigid structure capable of standing upright in the vertically
elevated position. In an embodiment, the mast 120 can be
pivotally coupled to the rig frame 110 so that the mast 120
can be raised and lowered between the vertical and non-
vertical positions via a lift cylinder 126. When the mast 120
is in the raised position, the drilling rig 100 is configured for
a drilling operation and when the mast 120 is lowered, the
drilling rig 100 is configured for a traveling operation.
Additionally, in the embodiments where the mast 120 is
pivotally coupled to the rig frame 110, the mast may be
oriented at an angle with respect to the surface of the drill
site 104 via the lift cylinder 126 so that a borehole 102 can
be formed angularly into the ground.

Supported on and moveable with respect to the mast 120
can be the components of a drilling system 130 of the mobile
drilling rig 100. The drilling system 130 can include a rotary
head 132 that is guided by and movable along the mast 120
during pulldown actions where the rotary head is lowered
toward the surface of the drill site 104 and during hoist
actions when the rotary head is raised above the drill site.
The rotary head 132 includes a body that is operatively
connected to the mast 120, for example, by guide tracks. To
raise and lower the rotary head 132 with respect to the mast
120, the drilling system 130 can include extendable and
retractable hydraulic actuators that are operatively con-
nected to the rotary head via a rope system with ropes or
cables directed about one or more pulleys or sheaves
mounted on the mast 120. Disposed in the rotary head 132 can be a rotatable, hydraulically driven driver that is coupled
to an elongated drill string 134 that is formed of a plurality
of string sections 136. The string sections 136 are straight
pipe-like structures that can be coupled together to adjust the
length of the drill string 134. Attached at the distal end of the
drill string 134 can be a drill bit 138 that is structurally
configured to penetrate into the upper surface of the drill site
104 and the subsurface underneath. The drill bit 138 can be
of a fixed configuration with flutes or blades that do not
move relative to the body of the drill bit or it can be of a
roller configuration with cutting elements or picks located
on two or more cone-shaped elements that are caused to roll
across the exterior of the body of the rotating drill bit. The
driver can rotate the drill string 134 and drill bit 138 attached
thereto to penetrate into the surface and subsurface of the
drill site 104.

To accommodate one or more human operators for con-
ducting drilling operations, an onboard operator station 140
may be accommodated on the rig frame 110. Located within
the operator station 140 can be various operator control
devices 142 such as levers, pedals, wheels, displays, and the
like. The operator control devices 142 can control both the
propulsion devices for travel and maneuvering the mobile
drill rig 100 and the drilling system 130 for forming bore-
holes 102 during drilling operations. In the illustrated
embodiment, the operator station 140 can be an enclosed
space but in other embodiments, the operator station may be
located exteriorly. Furthermore, in possible embodiments,
the mobile drilling rig 100 can be configured for remote
operation with the operator station 140 and the operator
control devices 142 located off board of and remote from the
mobile drilling rig 100. In further possible embodiments, the
mobile drilling rig 100 can be configured for autonomous or
semi-autonomous operation. In autonomous operation, the
drilling rig is operated according to a predetermined plan
without the assistance of a human operator, while in semi-
autonomous operation, a human operator, who may be
present on the mobile drilling rig or may be at a remote
location, may be responsible for directing the drilling rig to
perform certain tasks.

Figure 2:
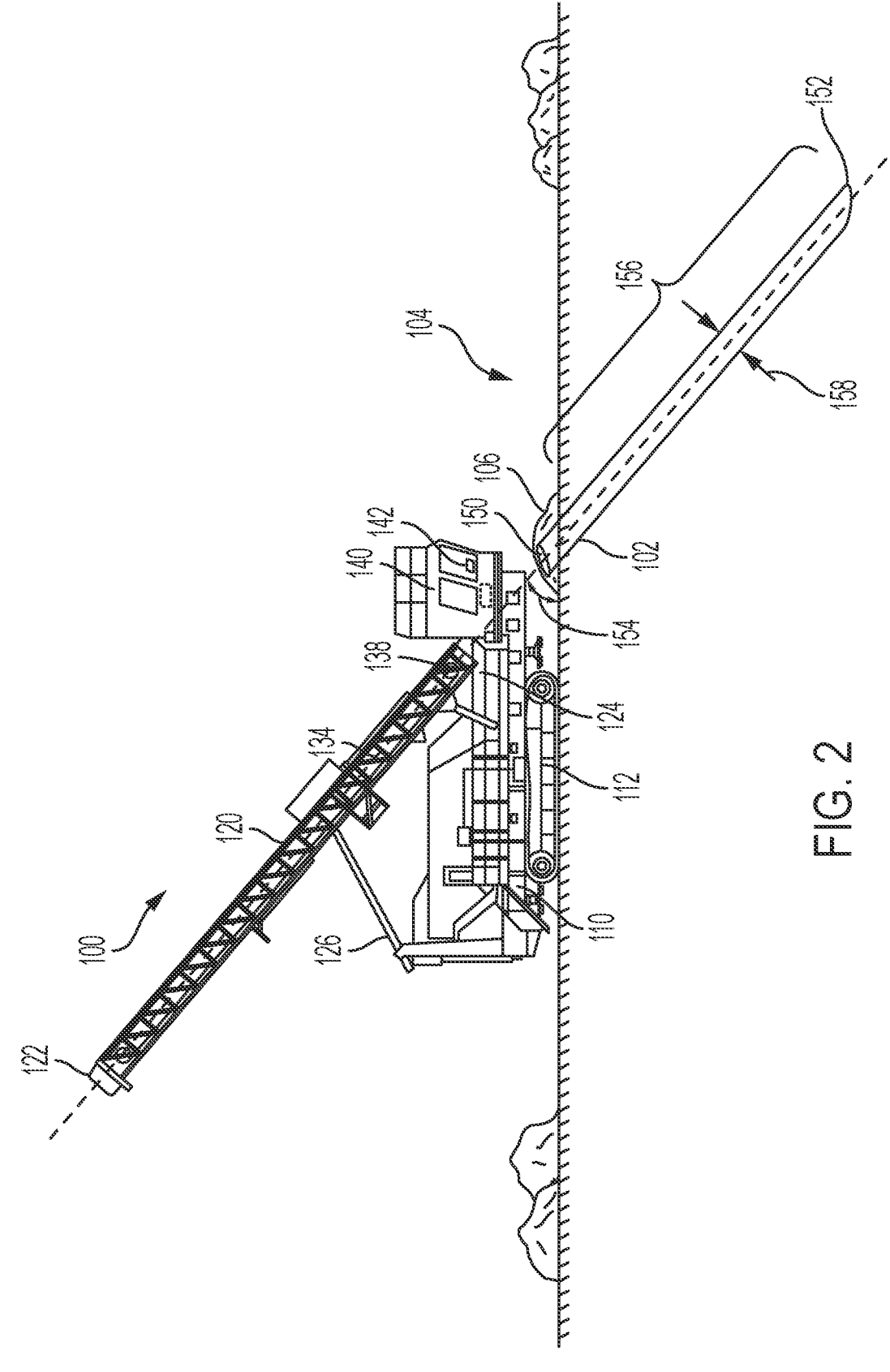
FIG. 2 is a schematic side view of a mobile drilling rig drilling a borehole into the ground at a drill site on an inclination angle in accordance with directional drilling.

Referring to FIG. 2, there is illustrated the mobile drilling
rig 100 conducting directional drilling of a borehole 102 into
the surface and subsurface of the drill site 104. Directional
drilling involves drilling a borehole 102 on a non-vertical
angle into the ground that, as shown in FIG. 2, deviates from
being perpendicular with respect to the surface of the drill
site 104. Directional drilling as illustrated in FIG. 2 is
enabled in part by pivotally mounting the mast 120 to the rig
frame 110 and by controlled adjustment of the extension and
retraction of the lift cylinder 126.

In directional drilling, the arrangement, location, and
direction of the borehole 102 can be defined by one or more
characteristics. For example, the borehole 102 will include
an entry point 150 created when the drill bit 138 attached to
the drill string 134 initially enters into the surface of the drill
site 104 and a bottom hole location 152 where the borehole
terminates at a particular distance into the ground. Addi-
tionally, the borehole 102 can be characterized by an incli-
nation angle 154 that is the angle with respect to the surface
of the drill site 104 at which the borehole 102 penetrates into
the ground. The inclination angle 154 can also determine the
deviation of the borehole 102 from a truly vertical orienta-
tion. Further, the borehole 102 can be characterized by a
borehole penetration length 156 which is the distance
between the entry point 150 and the bottom hole location
152. Because the borehole 102 can be angularly arranged
along the inclination angle 154, the borehole penetration length 156 may not be the same as the vertical depth of the borehole 102 and may include a horizontal component. Furthermore, the borehole 102 can be characterized by a borehole diameter 158 that may correspond to or be determined in part by the diameter of the drill bit 138 used to form the borehole 102.

Figure 3:
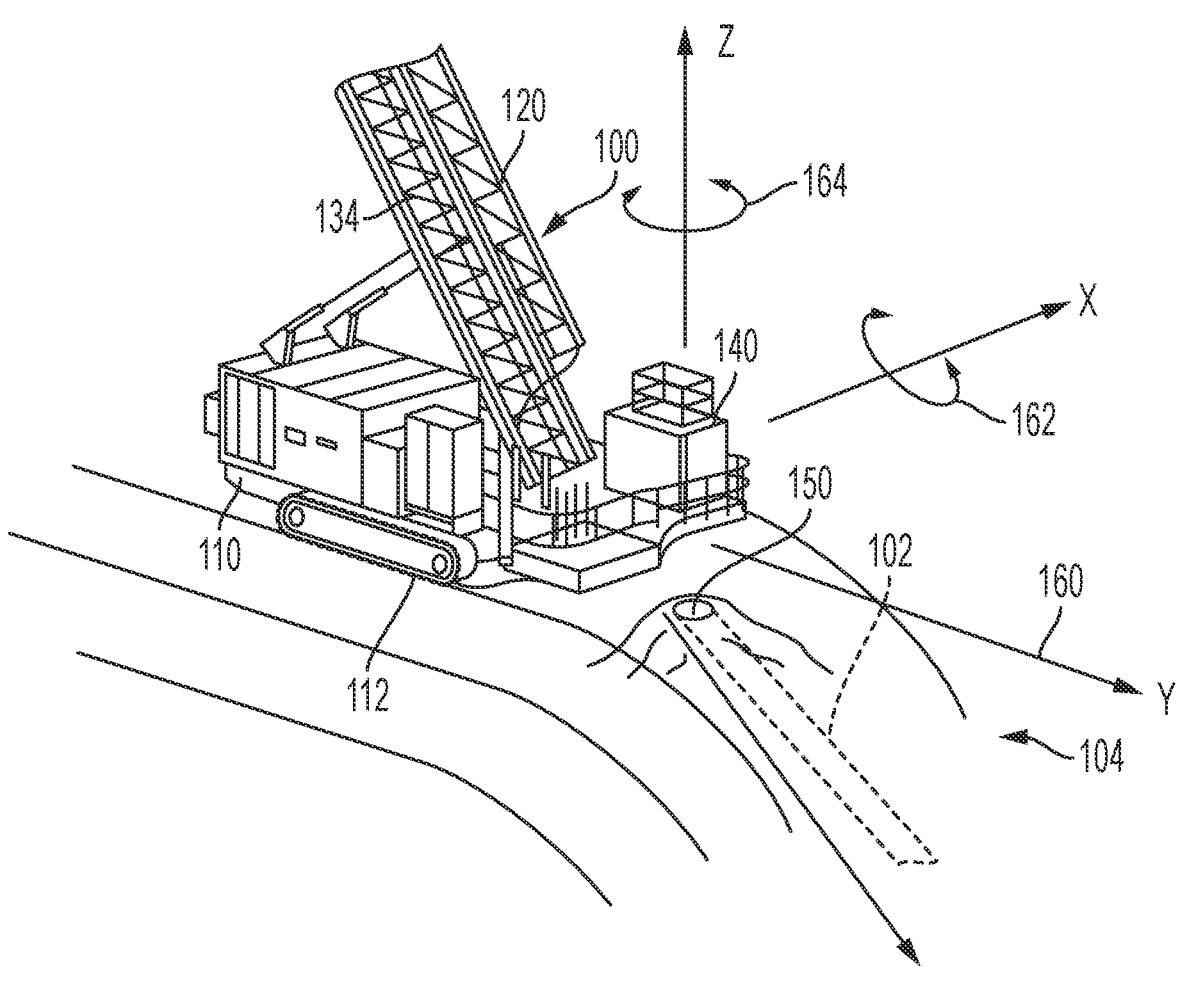
FIG. 3 is a schematic perspective view of a mobile drilling rig configured to drill a borehole into the ground at a drill site that is oriented along a directional heading and a pitch angle.

Referring to FIG. 3, the borehole 102 can be characterized by additional angular orientations and alignments with respect to the surface of the drill site 104. For example, the borehole 102 may be aligned along a directional heading 160 that is generally directed forward of the rig frame 110 of the mobile drilling rig 100. Because the surface topology of the drill site 104 is typically uneven, the rig frame 110 may be disposed on an incline or decline with respect to the location of the entry point 150 of the borehole 102 into the surface of the drill site 104. Accordingly, a borehole 102 drilled into the drill site 104 by the drilling rig 100 can generally be aligned along a pitch angle 162 that deviates from the true directional heading 160 of the mobile drilling rig 100. The pitch angle 162 can represent angular rotation about an X-axis of the drilling rig 100 as shown in FIG. 3.

The mobile drilling rig 100 may also turn or articulate laterally during a drilling operation thereby resulting in a further deviation of the borehole with respect to the directional heading 160. This may correspond to a yaw angle 164 of the mobile drilling rig 100 with respect to the surface of the drill site 104 proximate the entry point 150 of the borehole 102. The yaw angle 164 may be generally normal to the directional heading angel 162 and may represent angular rotation about a Z-axis of the drilling rig. A borehole 102 drilled into the drill site 104 by the drilling rig 100 can generally be aligned along the yaw angel 164. The angular orientation and alignments such as the inclination angle 154, the pitch angle 162, and the yaw angle 164 can be referred to as directional data associated with the borehole 102. It can be appreciated that the borehole 102 can be characterized by additional angles and alignments.

Referring back to FIG. 2 and as stated above, a result of drilling boreholes 102 is the formation of material piles 106 from the accumulation of cuttings deposited on the surface of the drill site 104. The drill bit 138 fractures or breaks apart the underlying material including rock and/or the more granular dirt and the drill string 134 can be configured to convey the material backwards through the borehole 102 to the entry point 150 where the material gathers and accumulates in a material pile 106 that generally surrounds the borehole 102. In directional drilling, it can be appreciated that more material may accumulate toward one side of the angled borehole 102 than at the opposite side of the borehole. The material pile 106 can be form as a mound or heap wherein the material including drill cuttings or grains of material loosely adhere together.

The material pile 106 can be characterized has having a particular material pile dimensions, size, and/or shape that is defined in part by the volume or quantity of material removed by the borehole 102 and by the packing density of the cuttings or more granular dirt. The packing density and/or the granularity of the material may be determined by the configuration of the drill bit 138, including the shape and arrangement of flutes, cutting teeth, or other cutting elements. Further, the dimensions of the material pile 106 can be further characterized has having a perimeter such as the distance surrounding the material pile and as having a height corresponding to the vertical dimension of the material pile rising above the otherwise planer surface of the drill site 104. The perimeter and the height of the material pile 106 correspond to the volume of the material that is transferred to the surface of the drill site 104 during drilling of the borehole 102.

Figure 4:
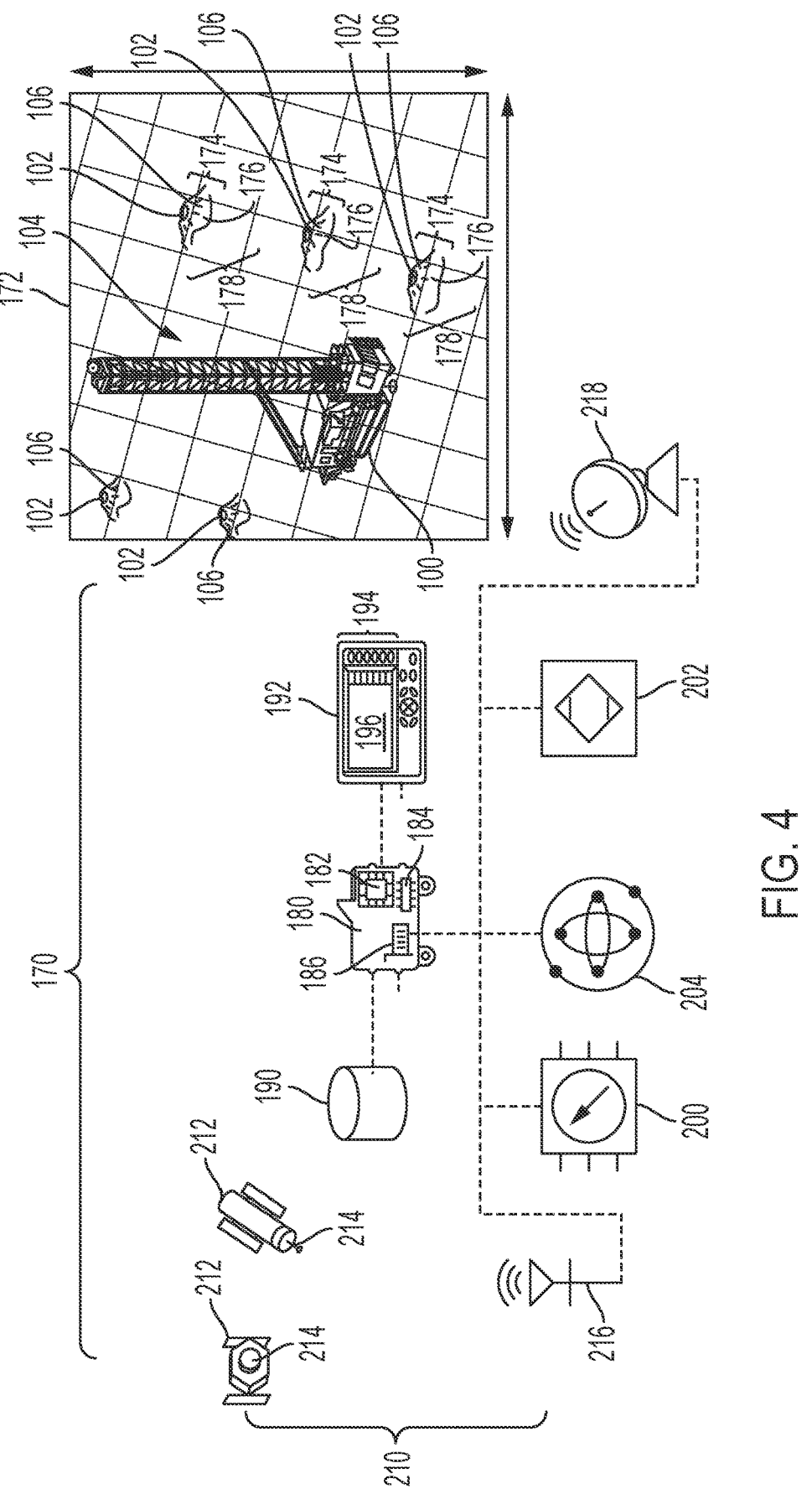
FIG. 4 is a schematic diagram of a possible example of a material pile mapping system in accordance with the disclosure that may generate a material pile map with the estimated borehole locations, material pile dimensions, sizes, shapes and/or other characteristics of the material piles about the drill site.

Data and information about the material piles 106 formed about the bore holes can be used to assist in navigation of the mobile drilling rig 100 about the drill site. For example, in some instances, it is desirable for the mobile drilling rig 100 and other mobile machines that may be operating about the drill site 104 to avoid contact with the material piles 106, which may result in inadvertently pushing material back into the borehole 102 and/or disrupting or impeding travel of the machines. Therefore, to avoid contact or collisions with the material plies 106, the mobile drilling rigs 100 can be associated with a material pile mapping system 170 that maps the borehole locations and the estimated size, shape and arrangement of the material piles. In an embodiment, the material pile mapping system 170 can generate one or more material pile maps 172 such as illustrated in FIG. 4 that includes information regarding the borehole locations, estimated material pile dimension, shape, size, and/or other characteristics of the material piles 106 at the drill site 104. The material pile map 172 may be a two-dimensional or three-dimensional representation, although in other embodiments, the material pile maps may be purely electronic or may take other forms. The material pile maps 172 can be associated with a coordinate system such as an X-Y grid system, and X-Y-Z grid system, or geographic coordinate system including latitude and longitude.

By way of example, the information included or reflected in the material pile map may include traits and objects like the borehole locations of the plurality of boreholes 102. The borehole locations may be indicated in reference to the grid or geographic coordinate systems and may be expressed in units of distance. Moreover, each material pile 106 can be associated with one or more material pile dimensions that reflect or characterize the size and/or shape of the material piles 106. For example, each material pile 106 can have a material pile height 174 that represents the vertical height or distance the material pile rises above a plane associated with the upper surface of the drill site 104 and a material pile perimeter 176 that represents the outline or boundary at the interface between the material pile and the upper surface of the drill site. These and other dimensions may be referred to as material pile dimensions 178 reflecting the size and shape of the material piles. The material pile maps 172 may also reflect and convey information regarding the distances and/or orientations between a mobile drilling rig 100, the borehole locations of the borehole 102 and the plurality of material piles 106 and may also indicate the velocity and/or heading of the mobile drilling rig 100 with respect to the drill site 104.

The material pile mapping system 170 can function using presently obtained data regarding operation of the mobile drilling rig 100 and using previously stored information to estimate particular material pile dimensions, characteristics, and attributes about the material piles 106. The material pile mapping system 170 and the material pile maps 172 that it may generate may assist operators of the mobile drilling rig 100 and/or other machines maneuvering about the drill site 104 or, if the mobile drilling rig is configured for autonomous operation, can autonomously navigate the mobile drilling rig about the drill site 104, for example, to avoid the material piles 106.

Referring to FIG. 4, there is illustrated an embodiment of the material pile mapping system 170 that can be implemented via one or more electronic controllers 180 that can be operatively associated with the mobile drilling rig and that may be located either onboard or remote from the mobile drilling rig. The electronic controller 180 can be a programmable computing device and can include one or more microprocessors 182 for processing computer executable instructions, programs, applications, and data in the form of software encoded as binary bits and bytes. Examples of suitable microprocessors 182 include programmable logic devices such as field programmable gate arrays ("FPGA"), dedicated or customized logic devices such as application specific integrated circuits ("ASIC"), gate arrays, a complex programmable logic device, or any other suitable type of circuitry or microchip. In addition, to store the software and data processed by the microprocessor 182, the electronic controller 180 can include non-transitory computer readable and writeable memory 184 such as read only memory ("ROM"), random access memory ("RAM"), EPROM memory, flash memory, or another suitable form of memory including magnetic or optical storage. The electronic controller 180 may also include input/output interfaces 186 such as data ports, serial ports, parallel ports, USB ports, jacks, and the like. While the illustrated embodiment of the electronic controller 180 is a unitary device, in other embodiments, the components and functionality of the electronic controller can be distributed among a plurality of devices.

To store additional information and data that may be used by the material pile mapping system 170 to make estimations regarding the borehole locations, the material pile dimensions, and other characteristics and attributes about the material piles, system may be operatively associated with a data storage 190 in electronic communication with the electronic controller 180 to supplement the memory 184 therein. The data storage 190 can be any suitable form of non-volatile memory including magnetic memory, hard drives, magnetic or optical disks, tapes, erasable programmable memory, (EPROM), programmable read only memory (PROM), and other storage mediums. The data storage 190 can store values of various parameters, factors, and/or variables related to the mobile drilling rig and the drilling operation such as dimensional data relating to the mobile drilling rig, the drill string and/or drill bit and the physical properties of the material at the drill site. The data and information can be stored in non-transitory form in data tables, data maps, or other suitable data structures to facilitate access and retrieval by the electronic controller 180.

To interface with an operator of the mobile drilling rig, whom may be located onboard or remote from the drilling rig itself, the material pile mapping system 170 can be operatively associated with an interface device 192, sometimes referred to as a human machine interface (HMI), to exchange information. The interface device 192 can include various input/output devices such as keypads, buttons, switches, etc. 194 through which commands can be received and can include a visual display 196 that can output a visual representation or display to an operator. For example, the visual display 196 can display the material pile map 172 in a human perceptible form. In an embodiment, the visual display 196 can be a liquid crystal display with touch screen capabilities.

To enable the electronic controller 180 to make estimates regarding the borehole locations and material pile dimensions, sizes, and other attributes of the material piles, the electronic controller can be operatively associated with and in electronic communication with various sensors, actuators, and systems associated with the drilling rig. For example, referring to FIGS. 2, 3, and 4, to determine the inclination angle 154 along which the borehole 102 is aligned, one or more rotation sensors 200 such as rotary encoders or the like can measure angular position. The rotation sensors 200 can be disposed to measure the angle of the mast 120 with respect to a reference that the electronic controller 180 can convert to the inclination angle 154 of the borehole 102.

To estimate the borehole penetration length 156, which is the distance between the entry point 150 and the bottom hole location 152, the material pile mapping system 170 can be associated with one or more position or proximity sensors 202 that can measure the extension of the drill string 134 with respect to another reference, for example, a position along the mast 120. Information regarding the extension of the drill string 134 can enable the material pile mapping system 170 to estimate the approximate position of the bottom hole location 152 of the borehole 102 within the ground at the drill site 104. To estimate the position of the entry point 150 of the borehole 102 into the surface of the drill site 104, the vertical dimension or height of the mobile drilling rig 100 above the surface of the drill site 104 may be predetermined and stored in the data storage 190. The electronic controller 180 can thereafter determine or estimate the approximate location of the entry point 150 on the surface of the drill site 104 based on the dimensional data regarding the rig frame 110 and the inclination angle 154 along which the borehole 102 is aligned. The electronic controller 180 can calculate the borehole penetration length 156 as the dimensional difference between the positions of the entry point 150 and the bottom hole location 152.

The material pile mapping system 170 may be associated with other sensors and instruments to obtain information regarding the mobile drilling rig and the drilling operation. For example, to measure other orientations of the mast 120 or drill string 134 of the mobile drilling ring 100 with respect to the drill site 104, including the directional heading angle 162 and the pitch angle 164, mentioned above, the material pile management system 170 can be associated with an inertial measurement unit (IMU) 204 which can measure linear and/or angular displacement with respect to one or more axes. An IMU may include accelerometers detecting linear acceleration and gyroscopes detecting rotational motion or rate. An IMU may be able to sense motion in relation to the x-y-z axes of a coordinate system and may measure rotation about any particular axis to provide pitch-yaw-roll data with respect to itself and therefore any object to which the IMU is mounted. In the illustrated embodiment, the IMU 204 may be mounted to or incorporated in the drill string 134 proximate to the drill bit 138 and can be used to track or trace the path by which the drill string 134 penetrates into the ground at the drill site 104 during directional drilling.

The material pile mapping system 170 may be associated with a position determination system such as a global navigation satellite system (GNSS) or global positioning satellite (GPS) system 210. In the GNSS or GPS system 210, a plurality of manmade satellites 212 orbit about the earth at fixed or precise trajectories. Each satellite 212 includes a positioning transmitter 214 that transmits positioning signals encoding time and positioning information towards earth. The positioning signals may be received by a transmitter/receiver 216 on earth and that can be mounted on or associated with the mobile drilling rig 100. The electronic controller 180 may calculate, such as by triangulation, between the positioning signals received from different satellites to determine the location and/or position of the mobile drilling rig with respect to the drill site 104.

To enable the material pile mapping system 170 to communicate with a plurality of mobile drilling rigs and/or other machines operating about the drill site 104, the material pile mapping system 170 can be operatively associated with a telematics or telecommunications system 218. Communication can occur wirelessly through radio waves between mobile drilling rigs and other machines that may include appropriate wireless transmitters/receivers or antennas. Communication can occur using any suitable protocol or standard such as Wi-Fi and Bluetooth and can occur over sufficient distances to cover the drill site 104.

INDUSTRIAL APPLICABILITY

Referring to FIG. 5, and with continued reference to the proceeding figures, there is illustrated a flow diagram 300 by which the material pile mapping system 170 described above can be implemented to estimate the locations, dimensions, and/or other characteristics associated with the material piles. The processes and steps in the flow diagram 300 may be implemented as non-transitory computer executable software written in programming code in the form of an application or program that may be processed by the electronic controller 180. It should be appreciated the precise and detailed processes described herein are exemplary for the purposes of the disclosure, and aspects of the processes may be used in different sequences or in various combinations.

In an initial navigation step 302, the mobile drilling rig 100 can be navigated to locations about the drill site 104 where it is desired to drill a borehole 102. The borehole 102 can be one of a plurality of boreholes to be drilled by the mobile drilling rig 100 and that may be accomplished according to a predetermined map or plan for the drill site 104. Navigation of the mobile drilling rig 100 may be done by an operator in accordance manual operation or may be done autonomously in accordance with autonomous operation. The mobile drilling rig 100 can conduct a drilling step 304 that forms the borehole 102 by extending and penetrating the drilling string 1322 into the surface of the drill site 104.

In a borehole marking step 306, the material pile mapping system 170 can mark or denote the borehole location of the borehole 102 formed by the mobile drilling rig 100. Marking of the borehole location can be conducted by a borehole marking subsystem 308 of the material pile mapping system 170 and can be accomplished by, for example, utilizing information from the GPS system 210 associated with the material pile mapping system 170. The borehole locations of the boreholes 102 can charted or marked in reference to a coordinate system or the like by the borehole marking subsystem 308 during the borehole marking step 306.

In addition to marking the borehole locations of the boreholes 102 with the borehole marking subsystem 308, the material pile mapping system 170 can include a material pile estimation subsystem 310 that can estimate characteristics and attributes regarding the material piles 106 such as, for example, the material pile dimensions 178 reflective of their size and/or shape. In an embodiment, the material pile dimensions 178 of the material piles 106 can be estimated or derived from an estimated material pile volume that is related to the quantity of material removed by drilling the borehole 102. As used herein, the term estimated may mean that a value is not directly measured but is derived from other values and parameters.

For example, in a pile volume estimation step 312, the estimated material pile volume can be estimated based on, for example, the borehole penetration length 156 and the borehole diameter 158. As indicated above, the borehole penetration length 156 can be calculated as the difference between the entry point 150 and the bottom hole location 152 of the borehole 102. The pile volume estimation step 312 can receive other data and information to assist in estimating the estimated material pile volume such as the borehole inclination angle 154 and information regarding the material properties 314 of the material and cuttings such as granularity and/or packing density. It can be appreciated that these material properties 314 can affect the material pile dimensions 178 reflecting the size, shape, and formation of the material pile 106.

In a pile dimension estimation step 314, the material pile estimation subsystem 310 can estimate the material pile dimensions 178 of the material piles 106, for example, in terms of material pile height 174 and material pile periphery 176. As illustrated in FIG. 4, each material pile 106 can be associated with a material pile height 174 that may represent its vertical distance above the upper surface of the drill site 104 and can be associated with a material pile perimeter 176 that encompasses, surrounds, or outlines the interface between the material piles 106 and the upper surface of the drill size 104. The material pile dimensions 178 including the material pile height 174 and the material pile perimeter 176 represent, or provide an indication, of the size and/or shape of the material pile 106. These dimensions can be measured in any suitable units including centimeters or inches.

In a subsequent generation step 318, the material pile mapping system 170 can generate a material pile map 172 such as indicated in FIG. 4. In an embodiment, the material pile map 172 can be generated by a map generation program 319 that includes computer-executable instructions for arranging and relating the data and information obtained regarding the borehole locations of the boreholes 102 and the estimated material pile dimensions 178 reflective of the sizes and/or shapes of the material piles 106 into a human or machine perceptible format. The generated material pile map 172 can include or convey information regarding the borehole locations of the boreholes 102 and the material pile dimensions 178 reflecting the size and/or shape of the material pile 106 formed about the boreholes 102. The generation step 318 can receive this information from borehole marking step 306 conducted with the borehole marking subsystem 308 and from the pile dimension estimation step 314 conducted by the material pile estimation subsystem 310. The generated material pile map 172 can be visibly perceptible to an operator, for example, a two-dimensional or three-dimensional map or chart, or may be purely electronic and interpretable by the electronic controller 180.

In an embodiment, the generated material pile map 172 can be used to assist maneuvering and navigating the mobile drilling rig 100 and/or other machines operating about the drill site 104 to avoid unintentional contact with the material piles 106. For example, this may be done in conjunction with a mobility control system 320 associated with the mobile drilling rigs 100 and possibly other machines. To utilize the material pile maps 172, in a transmission step 322, the material pile maps 172 can be transmitted to and received by the mobility control system 320. Transmission can be accomplished wirelessly, for example, by sending and receiving radio waves representing signals that the electronic controller 180 can decode and reconstruct into the material pile maps 172. The material pile maps 172 can be stored in, for example, the data storage 190 associated with the electronic controller 180.

The mobility control system 320, which may be run or executed by the electronic controller 180, can analyze and use the material pile maps 172 to control travel of the mobile drilling rigs 100 and/or other machines about the drill site 104. For example, the mobility control system 320 can be configured to conduct a travel termination step 324. If the mobile drilling rig 100, for example, is approaching toward a material pile 106 with the possibility of contacting the material pile 106, the mobility control system 320 can trigger an alarm to an operator or, in the possible case of autonomous operation, can terminate travel of the mobile drilling rig.

In a more particular example, the mobility control system 320 may compare the borehole locations of the boreholes 102 and the material pile dimensions 178 of the material piles 106 obtained from the material pile maps 172 with the present location, travel direction and/or velocity of the mobile drilling rig 100, that may be obtained from the GPS system 210, and may use predetermined dimensional data about the rig frame 110 that can be stored in and obtained from the data storage 190, to properly assess and conduct the travel termination step 324. For example, the mobility control system 320 can include or receive data representing material pile proximity thresholds 326 to determine if the mobile drilling rig 100 is close to intersecting or contacting a material pile 106. In a comparison step 328, the mobility control system 320 can compare the present location of the mobile drilling rig, which may be obtained from the GPS system 210, with the proximity threshold 326. If the mobile drilling rig 100 is outside the proximity threshold, operation may continue as intended; however, it the mobile drilling rig 100 is within the proximity threshold 326, the mobility control system 320 can conduct the travel termination step 324. In an embodiment, the proximity threshold 326 can be dependent on the material pile dimension 178 such that a larger material pile dimension may warrant a larger proximity threshold 326 for the mobile drilling rig 100.

Figure 6:
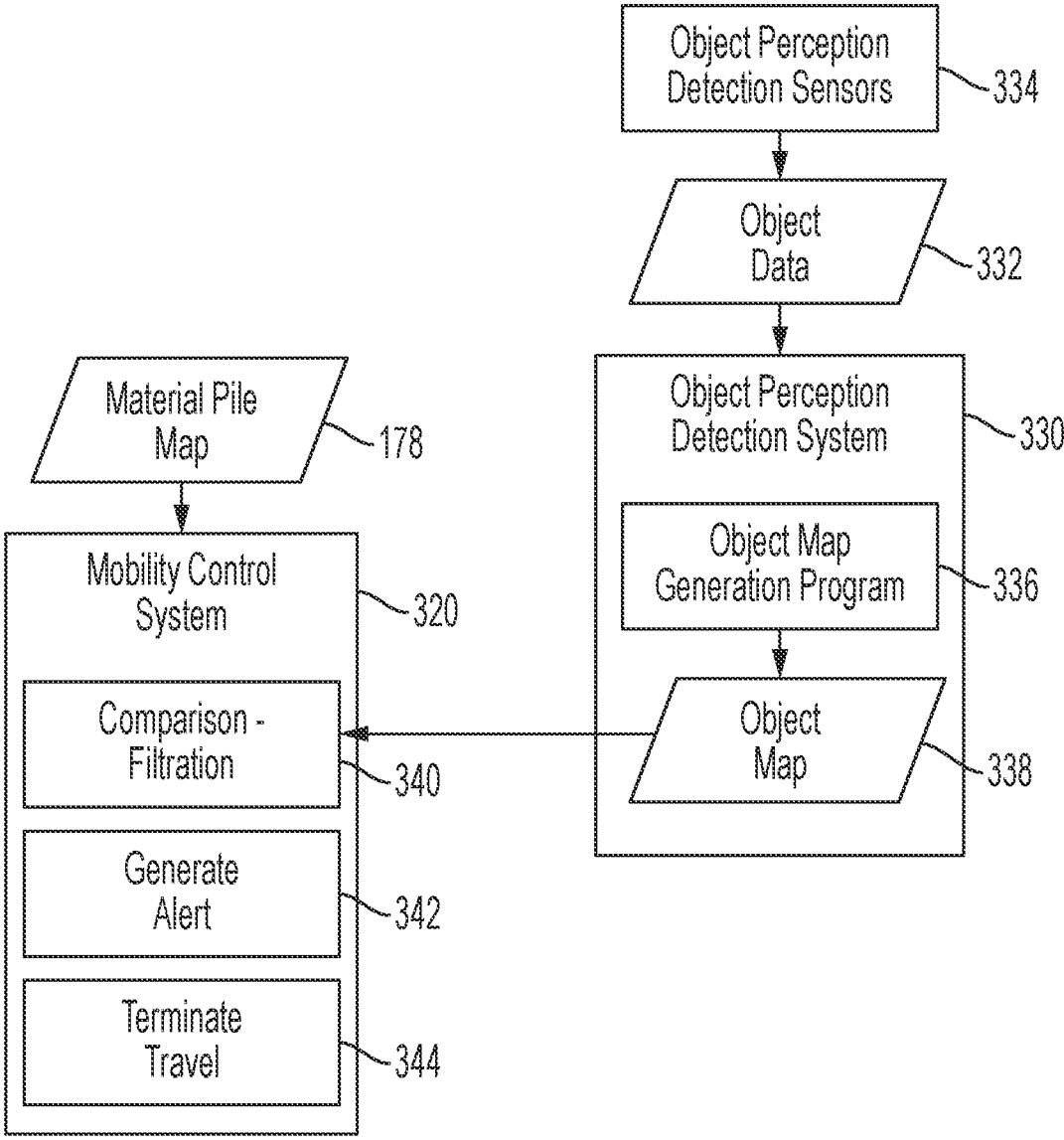
FIG. 6 is an illustrative schematic of an embodiment in which the generated material pile maps may be used in association with an object perception/detection system to assess objects located about a drill site.

In another embodiment, the generated material pile map 172 can be used to assess the various types of objects and obstacles about a drill site to assist in navigation. Referring to FIG. 6, the mobility control system 320 can be used in cooperation with an object perception/detection system 330 to determine the nature of the situation presented by a perceived object and to assist in operation of the mobile drilling rig with respect to the object. For example, contact with a material pile 106 of loose cuttings may not damage a mobile drilling rig, but contact with another machine or different object could be detrimental.

The object perception/detection system 330 may receive object data 332 from one or more object perception/detection sensors 334 associated with the mobile drilling rig 100 or another mobile machine. Examples of object perception/detection sensors 334 may include optical or acoustic range finders, radar, lidar, smart cameras, etc. The object perception/detection system 330 may include an object map generation program 336 that includes computer-executable instructions that can generate from the object data 332 an object map 338 of detected objects about the drill site 104 similar to the map generation program 319 for mapping material piles.

The object map 338 can be transmitted to the mobility control system 320 that may also receive the material pile map 172. The mobility control system 320 can be programmed to conduct a comparison-filtration step 340 that compares the material pile map 172 and the object map 338. The comparison-filtration step 340 can resolve or determine whether detected objects in the object map 338 that correspond in location and/or dimension to the material piles 106 in the material pile map 172 are actually material piles 106. Material piles 106 may not present a hazard to the mobile drilling rig or other mobile machine and can be disregarded. However, if the detected object does not correspond to a material pile 106, the mobility control system 320 may issue an alert 342 to an operator or may conduct a travel termination step 344 until the actual nature of the detected object has been further assessed. The foregoing allocations of tasks between the motion control system 320 and the object perception/detection system 330 is exemplary and tasks may be modified or conducted by either system accordingly.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A mobile drilling rig for drilling a plurality of boreholes about a drill site, the mobile drilling rig comprising:

a rig frame supported on a plurality of propulsion devices for travel about the drill site;

a drill string that is extendable with respect to a mast mounted on the rig frame for drilling a plurality of boreholes into a surface of the drill site;

a material pile mapping system comprising computer executable programming instructions and including:

a borehole marking program for marking a borehole location for each of the plurality of boreholes, resulting a plurality of borehole locations;

an electronic controller for calculating a borehole penetration length;

a material pile estimation program for estimating one or more material pile geometric dimensions, including at least a material pile height and a material pile perimeter, based in part on (i) the borehole penetration length, (ii) a granularity associated with the material, and (iii) a borehole diameter of a borehole, the one or more material pile geometric dimensions associated with a material pile formed about each of the plurality of boreholes by material removed during drilling of the plurality of boreholes, resulting in a plurality of one or more material pile geometric dimensions;

a map generation program programmed to generate a material pile map including the plurality of borehole locations for each of the plurality of boreholes and the one or more material pile geometric dimensions for each of the plurality of boreholes, and a mobility control system to navigate the mobile drilling rig about the drill site using the material pile map to avoid contact with the material pile.

2. The mobile drilling rig of claim 1, wherein the one or more material pile geometric dimensions are based on an estimated material pile volume of the material removed by drilling each of the plurality of boreholes.

3. The mobile drilling rig of claim 2, wherein the estimated material pile volume is further determined based on directional data associated with each of the plurality of boreholes.

4. The mobile drilling rig of claim 1, wherein the borehole penetration length is based on a difference in distance between an entry point of the borehole into a surface of the drill site and a bottom hole location of the borehole.

5. The mobile drilling rig of claim 1 wherein the mobility control system is programmed to execute a travel termination step if the mobile drilling rig is within a material pile proximity threshold associated with the one or more material pile geometric dimensions.

6. The mobile drilling rig of claim 1, wherein the material pile mapping system is operatively associated with an interface device including a visual display to visibly display the material pile map.

7. A material pile mapping system for navigating a mobile drilling rig about a drill site comprising:

a borehole marking program programmed to mark a borehole location of a borehole drilled into a drill site by a mobile drilling rig;

an electronic controller for calculating a borehole penetration length;

a material pile estimation program programmed to estimate one or more material pile geometric dimensions, including one or more of a material pile height and a material pile perimeter, based on (i) the borehole penetration length, (ii) a granularity associated with the material, and (iii) a borehole diameter of the borehole, the one or more material pile geometric dimensions associated with a material pile formed about the borehole by material removed during drilling of the borehole; and a map generation program programmed to generate a material pile map including the borehole location and the one or more material pile geometric dimensions, and a mobility control system to navigate the mobile drilling rig about the drill site using the material pile map to avoid contact with the material pile.

8. The material pile mapping system of claim 7, wherein the one or more material pile geometric dimensions are based on an estimated material pile volume of material removed by drilling of the borehole.

9. The material pile mapping system of claim 7, wherein the borehole penetration length is based on a difference in distance between an entry point of the borehole into a surface of the drill site and a bottom hole location of the borehole.

10. The material pile mapping system of claim 9, wherein the estimated material pile volume is further determined based on directional data associated with the borehole.

11. The material pile mapping system of claim 10, wherein the directional data includes one or more of an inclination angle of the borehole with respect to a surface of the drill site, a directional heading angle of the borehole with respect to the surface of the drill site, and a pitch angle of the borehole with respect to the surface of the drill site.

12. The material pile mapping system of claim 7, wherein the material pile mapping system is operatively associated with the mobility control system configured to terminate travel of the mobile drilling rig if the mobile drilling rig is within a material pile proximity threshold associated with the one or more material pile geometric dimensions.

13. A method of operating a mobile drill rig comprising:

drilling a borehole into a surface at a drill site with a drill string of a mobile drilling rig;

marking a borehole location of the borehole at the drill site;

calculating a penetration length of the borehole;

estimating an estimated material pile volume of a material removed by drilling of the borehole, the estimated material pile volume estimated from (i) the penetration length of the borehole, (ii) a granularity associated with the material, and (iii) a borehole diameter;

estimating a material pile geometric dimension including a material pile height and a material pile perimeter predicated on the estimated material pile volume, generating a material pile map including the borehole location and the material pile geometric dimension; and navigating the mobile drill rig about the drill site using the material pile map and the material pile geometric dimension therein to avoid contact with the material pile.

14. The method of claim 13, wherein the penetration length of the borehole is a difference in distance between an entry point of the borehole into a surface of the drill site and a bottom hole location of the borehole.

* * * * *